US007792498B2

(12) United States Patent
Tsfaty et al.

(10) Patent No.: US 7,792,498 B2
(45) Date of Patent: Sep. 7, 2010

(54) APPARATUS FOR AND METHOD OF AUTOMATIC RADIO LINK ESTABLISHMENT

(75) Inventors: Yossi Tsfaty, Rishon Letzion (IL); Itay Sherman, Ra'anana (IL)

(73) Assignee: Texas Instruments Incorporated, Dallas, TX (US)

( * ) Notice: Subject to any disclaimer, the term of this patent is extended or adjusted under 35 U.S.C. 154(b) by 734 days.

(21) Appl. No.: 11/617,631

(22) Filed: Dec. 28, 2006

(65) Prior Publication Data

US 2008/0160928 A1 Jul. 3, 2008

(51) Int. Cl.
*H04B 1/40* (2006.01)

(52) U.S. Cl. ........................................................ 455/88

(58) Field of Classification Search .................. 455/42, 455/67.11, 62, 567, 3.01, 127.5, 277.1, 161.1, 455/3.02

See application file for complete search history.

(56) References Cited

U.S. PATENT DOCUMENTS 5,970,390 A * 10/1999 Koga et al. .................... 455/42
6,112,064 A 8/2000 Arrowsmith et al. ..... 455/186.1
6,493,546 B2 * 12/2002 Patsiokas ................. 455/277.1
6,782,239 B2 * 8/2004 Johnson et al. ............... 455/42
6,810,233 B2 * 10/2004 Patsiokas ................... 455/3.02
7,062,238 B2 * 6/2006 Glaza ...................... 455/161.1
2003/0036357 A1 * 2/2003 McGowan ................... 455/62
2005/0143139 A1 * 6/2005 Park et al. .................... 455/567
2007/0087683 A1 * 4/2007 Hsieh et al. ................ 455/3.01
2008/0146159 A1 * 6/2008 Faltman et al. ........... 455/67.11
2008/0200125 A1 * 8/2008 Caldwell et al. .............. 455/42
2009/0054020 A1 * 2/2009 Mason .................... 455/127.5

FOREIGN PATENT DOCUMENTS

WO WO 2005086394 A1 * 9/2005
WO WO 2006106379 A1 * 10/2006

* cited by examiner

*Primary Examiner*—Yuwen Pan
*Assistant Examiner*—Gennadiy Tsvey
(74) *Attorney, Agent, or Firm*—Wade J. Brady, III; Frederick J. Telecky, Jr.

(57) ABSTRACT

A novel and useful mechanism for automatically establishing a radio link between a communications device and a commercially available FM radio receiver, thereby eliminating the need to manually configure both the target FM radio receiver and the FM transmitter to a suitable FM station. The mechanism scans the RF spectrum periodically for candidate frequencies over which to transmit the desired audio signal to the target radio. Once a suitable frequency is detected, the mechanism waits for an incoming call in the case of a cellular phone or immediately establishes a link such as in the case of a multimedia player. When a connection is to be established, a Radio Data System compatible bitstream is transmitted to configure the target radio to jump to an "alternate frequency" when reception conditions are poor enough. To ensure that the target radio receiver jumps to the desired station, the FM transmitter sends a CW signal to jam or block the station the target radio is currently tuned to. This causes the target radio to jump to the alternate frequency.

20 Claims, 5 Drawing Sheets

APPARATUS FOR AND METHOD OF AUTOMATIC RADIO LINK ESTABLISHMENT

FIELD OF THE INVENTION

The present invention relates to the field of data communications and more particularly relates to an apparatus, method and system for providing a remote communication device, such as a portable multimedia player, the capability to automatically establishing a radio link to a compatible FM receiver such as a Radio Data Service (RDS) capable radio.

BACKGROUND OF THE INVENTION

Currently there are numerous consumer electronics communications devices such as portable multimedia players, add-ons for portable multimedia players, cellular telephones, personal digital assistants (PDAs), etc. that have the ability to playback audio on FM stereo radios. To accomplish this, these communication devices incorporate an FM transmitter for transmitting an FM signal typically at very low power levels to an FM radio located relatively close by. In a typical application, a communication devices is used to playback audio (i.e. music, etc.) through a car's built-in FM receiver. The FM transmitter functions to modulate the audio signal onto an FM carrier signal and broadcast the FM modulated audio signal. The FM carrier is set to a particular carrier frequency typically selected from a group of several available frequencies.

The FM radio receiver in the car must be manually tuned by a user to this frequency in order for the audio to be heard over the car's sound system. Since FM radio receivers do not have a mechanism of automatically tuning to the transmission frequency of the FM tuner, the FM radio must be tuned to the desired frequency manually.

Not only does the user have to manually tune the FM receiver to one of the frequencies available on the FM transmitter, but the selected frequency must not be occupied by a FM radio station. Either the selected frequency must not be occupied or the signal received from the FM radio station must be very weak that the signal generated by the FM transmitter is strong enough to overpower it. Further, in order to playback the audio over the car stereo system, the user must first find a quiet station that is one of the stations that the FM transmitter is capable of transmitting on. Both the transmitting frequency on the FM transmitter and the frequency the FM receiver is tuned to must be set manually by trial and error. By trial and error, the user eventually finds a station that is quiet enough to receive and playback the signal from the FM transmitter. Once tuned to that station, the user then manually configures the FM transmitter to transmit over that frequency.

It is therefore desirable to have a mechanism whereby a radio link between an FM transmitter incorporated in a communication device and an FM receiver is established automatically without the need for the user to manually tune the FM receiver to the desired frequency. It is also desirable that the mechanism also include automatic means of finding a quiet frequency over which to transmit the audio signal. The automatic setup of the connection should be accomplished with minimal latency. Ideally it is low enough to support phone conversations to enable the conveyance of audio signals from a cellular handset to the car radio thus creating a "car-kit" set.

SUMMARY OF THE INVENTION

The present invention is a novel and useful apparatus for and method of automatically establishing a radio link (i.e. connection) between a communications device and a commercially available FM radio receiver. Use of the invention eliminates the need to manually configure both the target FM radio receiver and the FM transmitter to a FM quiet station in, as in the case with the prior art. The invention achieves low latency for link setup and is especially applicable to phone call conversation link setup. Further, the output of the FM transmitter can be adjusted in accordance with the detected signal strength of the candidate transmit frequency.

In one embodiment of the invention, the mechanism is operative to scan the RF spectrum periodically for candidate frequencies over which to transmit the desired audio signal to the target radio. Once a suitable frequency is detected, the mechanism waits for an incoming call in the case of a cellular phone or immediately establishes a link such as in the case of a multimedia player.

During the above periodic frequency search, the mechanism also searches for a candidate frequency over which the car's radio or target FM receiver is tuned to (hereafter termed the "candidate current Rx frequency"). This candidate frequency is detected by the presence of a CW wave with a frequency separation of 10.7 MHz above or below a detected broadcast FM station (which is found by detection of a strong wide spectrum of 200 kHz bandwidth).

The mechanism uses the above "candidate current Rx frequency" to inform the receiver the target frequency on which the target receiver will be tuned to. This is done by the generation and sending of a bitstream compatible with the radio data system (RDS) comprising an "alternate frequency" or "AF" command that is received by the target radio. This command instructs the target radio to jump to the alternate frequency when reception conditions deteriorate sufficiently. To ensure that the target radio receiver jumps to the desired station, the FM transmitter sends a CW signal to jam or block the station the target radio is currently tuned to. This causes the target radio to jump to the alternate frequency.

Although the mechanism of the present invention can be used in numerous types of communication systems, to aid in illustrating the principles of the present invention, the description of the automatic radio link establishment mechanism is provided in the context of a communication device adapted to establish a link with a commercial FM radio receiver. The automatic radio link establishment mechanism of the present invention can be incorporated in a communication device such a multimedia player, cellular phone, PDA, etc. Although the invention is described in the context of a cellular phone, it is appreciated that the invention is not limited to the example applications presented, but that one skilled in the art can apply the principles of the invention to other communication systems as well without departing from the scope of the invention.

The automatic radio link establishment mechanism has several advantages including the following: (1) the link between the FM transmitter and target FM radio receiver is established automatically without user intervention; (2) the link is established with sufficiently low latency to support telephone conversation call setup (e.g., less than 0.5 second); (3) the link establishment mechanism finds a quiet frequency on which to transmit thus requiring very low power FM stereo emissions suitable for intentional radiation emission; and (4) the transmit power is configured proportional to the measured signal strength of the selected candidate frequency or the station the target radio is currently tuned to.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the present invention, a method of establishing a communications link between a target frequency modulation (FM) radio receiver and a communications device having an FM transmitter and FM receiver, the method comprising the steps of scanning an FM spectrum for one or more sufficiently quiet candidate frequencies and for the frequency that the FM radio receiver is currently tuned to, selecting one of the one or more candidate stations as an alternative frequency for the target FM radio receiver, sending a transmission incorporating the alternate frequency from the FM transmitter to the target FM radio receiver over the frequency the FM radio receiver is currently tuned to and generating interference on the FM transmitter to cause the target FM radio receiver to switch to the alternate frequency.

There is also provided in accordance with the present invention, an apparatus for use in a communications device for establishing a communications link between a target frequency modulation (FM) radio receiver and the communications device, the communications device having an FM transmitter and FM receiver, the apparatus comprising means for configuring the FM receiver to scan an FM spectrum for one or more sufficiently quiet candidate frequencies and for the frequency the target FM radio receiver is currently tuned to, means for selecting one of the one or more candidate stations as an alternative frequency for the target FM radio receiver, means for sending a transmission incorporating the alternate frequency from the FM transmitter to the target FM radio receiver over the frequency the FM radio receiver is currently tuned to and means for generating interference on the FM transmitter to cause the target FM radio receiver to switch to the alternate frequency.

There is further provided in accordance with the present invention, a communications device comprising a frequency modulation (FM) transmitter, an FM receiver, an audio source, a processor coupled to the FM transmitter and the FM receiver, the processor operative to configure the FM receiver to scan an FM spectrum for one or more sufficiently quiet candidate frequencies and for the frequency the target FM radio receiver is currently tuned to, select one of the one or more candidate stations as an alternative frequency for the target FM radio receiver, generate and send a transmission incorporating the alternate frequency from the FM transmitter to the target FM radio receiver over the frequency the FM radio receiver is currently tuned to, generate interference on the FM transmitter to cause the target FM radio receiver to switch to the alternate frequency, means for FM modulating an audio signal provided by the audio source at a carrier frequency corresponding to the alternate frequency to yield a desired FM signal therefrom and means for transmitting the desired FM signal via the FM transmitter to the target FM radio receiver.

There is also provided in accordance with the present invention, a method of establishing a communications link between a target frequency modulation (FM) radio receiver and a communications device having an FM transmitter and FM receiver, the method comprising the steps of scanning an FM spectrum on the FM receiver to detect local oscillator leakage from the target FM radio receiver so as to determine an FM station the target FM radio receiver is currently tuned to, determining whether the currently tuned FM station is a suitable candidate for FM transmission and if the currently tuned FM station is a suitable candidate, FM modulating an audio signal and broadcasting the resulting FM signal via the FM transmitter for reception by the target FM radio receiver.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
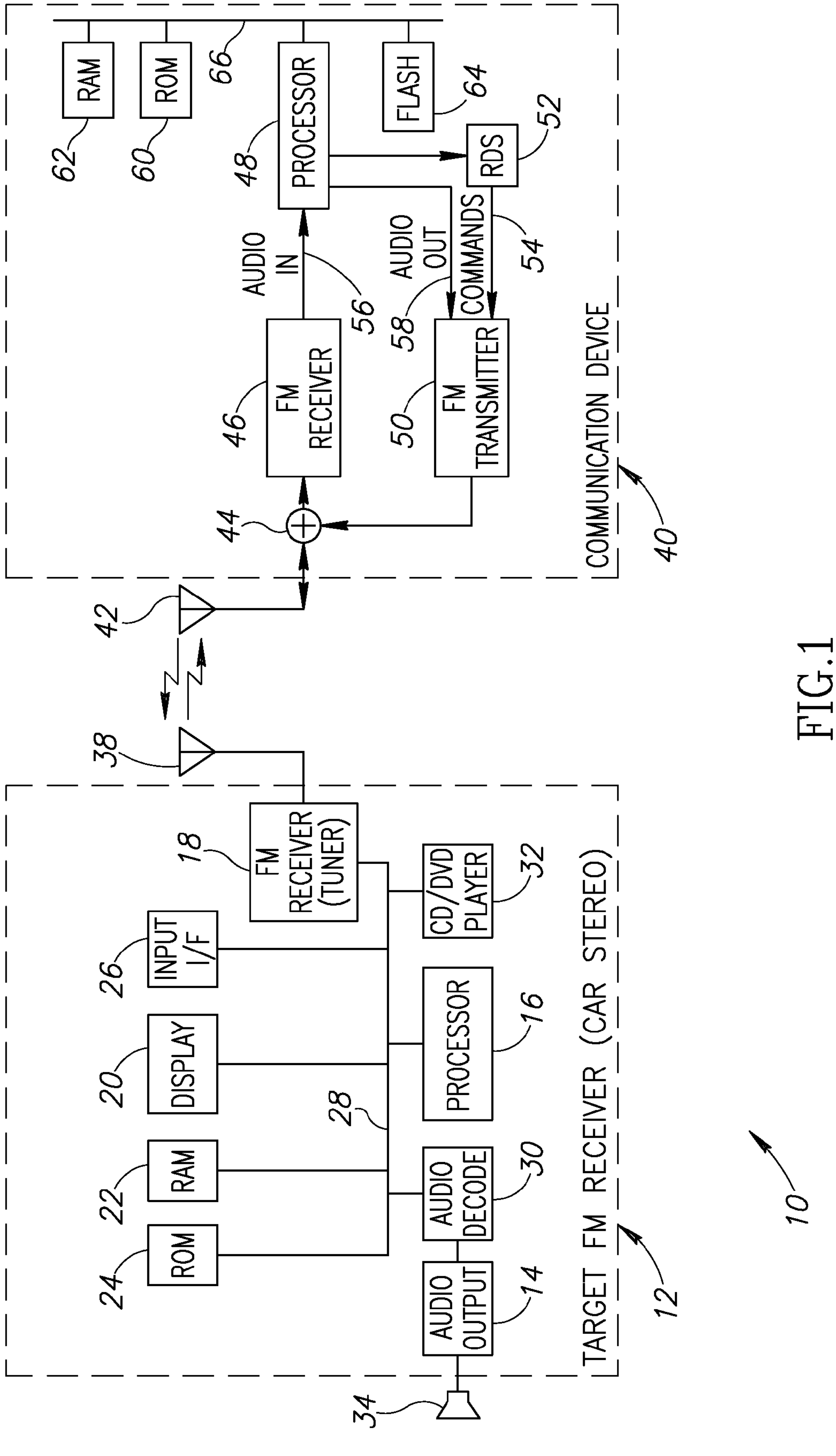
FIG. 1 is a block diagram illustrating an example audio link established between an FM tuner and a communication device such as a cellular phone or multimedia player.

The following notation is used throughout this document.

| Term | Definition |
|---|---|
| AC | Alternating Current |
| AF | Alternate Frequency |
| ASIC | Application Specific Integrated Circuit |
| AVI | Audio Video Interleave |
| BMP | Windows Bitmap |
| CD | Compact Disc |
| CPU | Central Processing Unit |
| CT | Clock Time |
| CW | Continuous Wave |
| DAC | Digital to Analog Converter |
| DC | Direct Current |
| DI | Decoder Identification |
| DSP | Digital Signal Processor |
| DVD | Digital Video Disc |
| EBU | European Broadcasting Union |
| ECC | Extended Country Code |
| EON | Enhanced Other Networks |
| EWS | Emergency Warning System |
| FM | Frequency Modulation |
| FPGA | Field Programmable Gate Array |
| GPS | Ground Positioning Satellite |
| HDL | Hardware Description Language |
| IEEE | Institute of Electrical and Electronics Engineers |
| IF | Intermediate Frequency |
| IH | In House |
| JPG | Joint Photographic Experts Group |
| LPF | Low Pass Filter |
| M/S | Music/Speech |
| MP3 | MPEG-1 Audio Layer 3 |
| MPG | Moving Picture Experts Group |
| ODA | Open Data Applications |
| PDA | Portable Digital Assistant |
| PI | Program Identification |
| PIN | Program Item Number |
| PS | Program Service |
| PTY | Program TYpe |

-continued

| Term | Definition |
|---|---|
| PTYN | Program TYpe Name |
| RAM | Random Access Memory |
| RBDS | Radio Broadcast Data System |
| RDS | Radio Data System |
| RF | Radio Frequency |
| ROM | Read Only Memory |
| RP | Radio Paging |
| RSSI | Received Signal Strength Indicator |
| RT | Radio Text |
| TA | Traffic Announcement |
| TDC | Transparent Data Channels |
| TMC | Traffic Message Channel |
| TP | Traffic Program |
| USB | Universal Serial Bus |
| UWB | Ultra Wideband |
| VHF | Very High Frequency |
| WLAN | Wireless Local Area Network |
| WMA | Windows Media Audio |
| WMV | Windows Media Video |

DETAILED DESCRIPTION OF THE INVENTION

The present invention provides a novel and useful apparatus for and method of automatically establishing a radio link (i.e. connection) between a communications device and a commercially available FM radio receiver. Use of the invention eliminates the need to manually configure both the target FM radio receiver and the FM transmitter to a FM quiet station in, as in the case with the prior art. The invention achieves low latency for link setup and is especially applicable to phone call conversation link setup. Further, the output of the FM transmitter can be adjusted in accordance with the detected signal strength of the candidate transmit frequency.

In one embodiment of the invention, the mechanism is operative to scan the RF spectrum periodically for candidate frequencies over which to transmit the desired audio signal to the target radio. Once a suitable frequency is detected, the mechanism waits for an incoming call in the case of a cellular phone or immediately establishes a link such as in the case of a multimedia player.

The mechanism generates and sends a bitstream compatible with the radio data system (RDS) comprising an "alternate frequency" or "AF" command that is received by the target radio. This command instructs the target radio to jump to the alternate frequency when reception conditions deteriorate sufficiently. To ensure that the target radio receiver jumps to the desired station, the FM transmitter sends a CW signal to jam or block the station the target radio is currently tuned to. This causes the target radio to jump to the alternate frequency.

Although the mechanism of the present invention can be used in numerous types of communication systems, to aid in illustrating the principles of the present invention, the description of the automatic radio link establishment mechanism is provided in the context of a communication device adapted to establish a link with a commercial FM radio receiver. The automatic radio link establishment mechanism of the present invention can be incorporated in a communication device such a multimedia player, cellular phone, PDA, etc. Although the invention is described in the context of a cellular phone, it is appreciated that the invention is not limited to the example applications presented, but that one skilled in the art can apply the principles of the invention to other communication systems as well without departing from the scope of the invention.

It is appreciated by one skilled in the art that the automatic radio link establishment mechanism of the present invention can be adapted for use with numerous other types of wired wireless communication systems without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMax, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

The mechanism of the present invention makes use of the Radio Data System (RDS) standard. The mechanism comprises circuitry (hardware, software or a combination thereof) that is compatible with the RDS system that sends extra information along with VHF/FM radio services to suitable receiving equipment without affecting the normal audio program. A brief description of the RDS is provided herein. RDS exploits the portion of the bandwidth assigned to an FM radio station for broadcasting that often is unused and thus wasted. RDS uses this unused bandwidth for transmission of a low bit rate data signal that is modulated into the radio station signal and transmitted along side it. This arrangement is very cost effective since the existing FM broadcast antenna towers can be used with very little modification.

The Radio Data System standard was issued by the European Broadcasting Union (EBU) for sending small amounts of digital information using conventional FM radio broadcasts. The Radio Broadcast Data System (RBDS) is the official name used for the United States version of RDS. References to the RDS system are meant to refer to the RBDS system as well. The RDS system standardizes several types of information transmitted, including time and station identification. The RDS has been in widespread use in Europe since the early 1990s, and less so in North America.

The RDS standard uses a 57 kHz subcarrier to carry data at 1187.5 bits per second (bps). The frequency of 57 kHz was chosen since it is the third harmonic of the pilot tone used for broadcast FM stereo, thus it would not cause interference or intermodulation with the pilot tone or with the 38 kHz stereo difference signal.

The RDS standard defines many features and commands which are enumerated below. The following information fields presented below are normally contained in the RDS data:

AF—Alternate Frequencies:

A list of alternative frequencies that provide information on the various transmitters broadcasting the same program in the same or adjacent reception areas, and which enable receivers equipped with a memory to store the list so as to reduce the time for switching to another transmitter. This command is particularly useful in the case of car and portable radios since it allows a receiver to re-tune to a different frequency providing the same content when the first signal becomes too weak (e.g., when moving out of range).

CT—Clock Time:

Information to synchronize a clock in the receiver or the main clock in a car. Time and date codes should use Coordinated Universal Time (UTC) and Modified Julian Day (MJD). If MJD=0 the receiver should not be updated. The listener, however, will not use this information directly and the conversion to local time and date will be made in the receiver's circuitry. CT is used as a time stamp by various RDS applications and thus it must be accurate.

DI—Decoder Identification and Dynamic PTY Indicator:

These bits indicate which possible operating modes are appropriate for use with the broadcast audio and to indicate if PTY codes are switched dynamically.

ECC—Extended Country Code:

RDS uses its own country codes consisting of eight bits. The first most significant bits of the PI code carry the RDS country code. Their four bit coding structure only permits the definition of 15 different codes, 1 to F (hex). Since there are much more countries to be identified, some countries have to share the same code which does not permit unique identification. Hence there is the need to use the Extended Country Code.

EON—Enhanced Other Networks Information:

This feature can be used to update the information stored in a receiver about program services other than the one received. Alternative frequencies, the PS name, Traffic Program and Traffic Announcement identification as well as Program Type and Program Item Number information can be transmitted for each other service. The relation to the corresponding program is established by means of the relevant Program Identification. Linkage information, consisting of four data elements, provides the means by which several program services may be treated by the receiver as a single service during times a common program is carried. Linkage information also provides a mechanism to signal an extended set of related services.

EWS—Emergency Warning System:

The EWS feature is intended to provide for the coding of warning messages. These messages will be broadcast only in cases of emergency and will only be evaluated by special receivers.

IH—In House Application:

This refers to data to be decoded only by the operator. Some examples noted are identification of transmission origin, remote switching of networks and paging of staff. The applications of coding may be decided by each operator itself.

M/S—Music/Speech Switch:

This is a two-state signal to provide information on whether music or speech is being broadcast. The signal would permit receivers to be equipped with two separate volume controls, one for music and one for speech, so that the listener could adjust the balance between them to suit his individual listening habits.

ODA—Open Data Applications:

The Open Data Applications feature allows data applications, not previously specified in EN 50067, to be conveyed in a number of allocated groups in an RDS transmission. The groups allocated are indicated by the use of type 3A group which is used to identify to a receiver the data application in use in accordance with the registration details.

PI—Program Identification:

This information consists of a code enabling the receiver to distinguish between countries, areas in which the same program is transmitted, and the identification of the program itself. The code is not intended for direct display and is assigned to each individual radio program, to enable it to be distinguished from all other program. One important application of this information would be to enable the receiver to search automatically for an alternative frequency in case of bad reception of the program to which the receiver is tuned; the criteria for the change-over to the new frequency would be the presence of a better signal having the same Program Identification code.

PIN—Program Item Number:

The code should enable receivers and recorders designed to make use of this feature to respond to the particular program item(s) that the user has preselected. Use is made of the scheduled program time, to which is added the day of the month in order to avoid ambiguity.

PS—Program Service Name:

This is the label of the program service consisting of not more than eight alphanumeric characters which is displayed by RDS receivers in order to inform the listener what program service is being broadcast by the station to which the receiver is tuned. An example for a name is "Radio 21." The Program Service name is not intended to be used for automatic search tuning and must not be used for giving sequential information.

PTY—Program Type:

This is an identification number to be transmitted with each program item and which is intended to specify the current Program Type within 31 possibilities. This code could be used for search tuning. The code will, moreover, enable suitable receivers and recorders to be pre-set to respond only to program items of the desired type. The last number, i.e. 31, is reserved for an alarm identification which is intended to switch on the audio signal when a receiver is operated in a waiting reception mode.

PTYN—Program Type Name:

The PTYN feature is used to further describe current PTY. PTYN permits the display of a more specific PTY description that the broadcaster can freely decide (e.g., PTY=4: Sport and PTYN: Football). The PTYN is not intended to change the default eight characters of PTY which will be used during search or wait modes, but only to show in detail the program type once tuned to a program. If the broadcaster is satisfied with a default PTY name, it is not necessary to use additional data capacity for PTYN. The Program Type Name is not intended to be used for automatic PTY selection and must not be used for giving sequential information.

RP—Radio Paging:

The RP feature is intended to provide radio paging using the existing VHF/FM broadcasts as a transport mechanism, thereby avoiding the need for a dedicated network of transmitters. Subscribers to a paging service will require a special pocket paging receiver in which the subscriber address code is stored.

RT—RadioText:

This refers to text transmissions coded appropriately, primarily addressed to consumer home receivers, which would be equipped with suitable display facilities.

TA—Traffic Announcement Identification:

This is an on/off switching signal to indicate when a traffic announcement is on air. The signal could be used in receivers to:

a. switch automatically from any audio mode to the traffic announcement;
b. switch on the traffic announcement automatically when the receiver is in a waiting reception mode and the audio signal is muted;
c. switch from a program to another one carrying a traffic announcement, according to possibilities available through EON.

After the end of the traffic announcement the initial operating mode will be restored.

TDC—Transparent Data Channels:

The transparent data channels consist of 32 channels which may be used to send any type of data.

TMC—Traffic Message Channel:

This feature is intended to be used for the coded transmission of traffic information.

TP—Traffic Program Identification:

This is a flag to indicate that the tuned program carries traffic announcements. The TP flag must only be set on programs which dynamically switch on the TA identification during traffic announcements. The signal shall be taken into account during automatic search tuning.

Example RDS Compatible Radio System

A block diagram illustrating an example audio link established between an FM tuner and a communication device such as a cellular phone or multimedia player is shown in FIG. 1. The system, generally referenced 10 comprises a target FM radio receiver 12 connected to an antenna 38 and speaker(s) 34 and a communications device 40 coupled to an antenna 42. The target FM radio receiver comprises a processor 16 coupled to a bus 28, read only memory (ROM) 24, random access memory (RAM) 22, a display 20, input means and interface 26, an audio decoder circuit 30, audio output circuit 14 (e.g., DACs, amplifier circuit, etc.), CD and/or DVD player 32 and FM receiver (i.e. FM tuner) 18.

The communications device 40 comprises a hybrid circuit or signal combiner 44, FM receiver 46, FM transmitter 50, processor 48 coupled to bus 66, radio data system (RDS) block 52, flash memory 64, ROM 60 and RAM 62.

The target FM radio receiver is the radio the method of the invention attempts to establish a connection with. It may comprise any suitable FM radio enabled equipment device including, for example, a multimedia player, personal media player/recorder, car stereo, home stereo, handheld radio, etc. The communications device may also comprise any suitable device able to receive and transmit an FM signal over broadcast frequencies. As an example the communications device may comprise a multimedia player (e.g., iPod or any other audio and/or video player), cell phone, radio (either mobile or stationary), personal digital assistant (PDA), Bluetooth radio, etc. Note that the communications device may comprise a so called FM adapter device that is commonly used to wirelessly transmit media data (i.e. songs, music, etc.) to the target radio receiver.

In one embodiment of the invention, the FM transmitter in the communications device and the target FM radio receiver are RDS compatible, meaning that the FM transmitter is configured to generate and transmit RDS based data (commands and/or messages) and the target FM radio receiver is configured to receive and understand the received RDS bitstream. Note that an RDS enabled radio is often referred to as a "smart radio."

The communication device, in accordance with the invention, is operative to automatically establish a link between itself and the target FM radio receiver without any intervention by the user. This means that a user can easily play a desired audio source or quickly setup a phone connection originating from the communication device through the target FM radio receiver.

Mobile Device/Cellular Phone/PDA System

Figure 2:
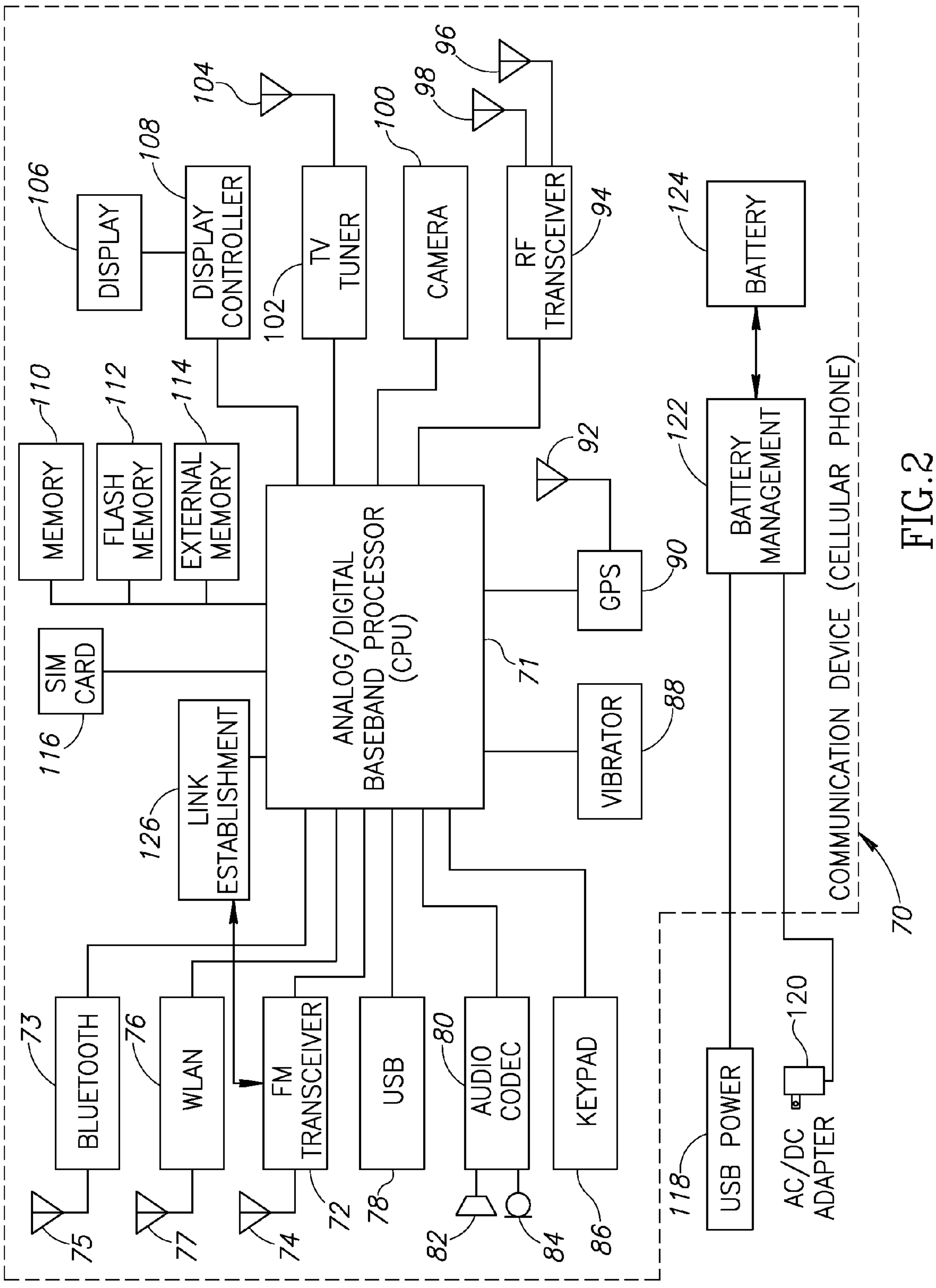
FIG. 2 is a block diagram illustrating an example communication device in more detail.

A block diagram illustrating an example communication device in more detail is shown in FIG. 2. The communication device may comprise any suitable device such as multimedia player, mobile device, cellular phone, PDA, Bluetooth device, etc. For illustration purposes only, the communication device is shown as a cellular phone. Note that this example is not intended to limit the scope of the invention as the automatic link establishment mechanism of the present invention can be implemented in a wide variety of communication devices.

The cellular phone, generally referenced 70, comprises a baseband processor or CPU 71 having analog and digital portions. The basic cellular link is provided by the RF transceiver 94 and related one or more antennas 96, 98. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver and associated antenna 92.

A USB interface connection 78 provides a serial link to a user's PC or other device. An FM transceiver 72 (i.e. FM transmitter and FM receiver) and antenna 74 provide the user the ability to listen to FM broadcasts. WLAN interface 76 and antenna 77 provide wireless connectivity when in a hot spot or within the range of an ad hoc, infrastructure or mesh based wireless network. Bluetooth interface 73 and antenna 75 provide Bluetooth wireless connectivity when within the range of a Bluetooth wireless network. SIM card 116 provides the interface to a user's SIM card for storing user data such as address book entries, etc.

An automatic link establishment block 126 is coupled to the FM transceiver and adapted to implement the automatic link establishment mechanism of the present invention. In one embodiment of the invention, the radio data system (RDS) compatible FM receiver and target FM radio receiver are used in establishing the link.

Portable power is provided by the battery 124 coupled to battery management circuitry 122. External power is provided via USB power 118 or an AC/DC adapter 120 connected to the battery management circuitry which is operative to manage the charging and discharging of the battery 124.

First Automatic Link Establishment Method

Figure 3:
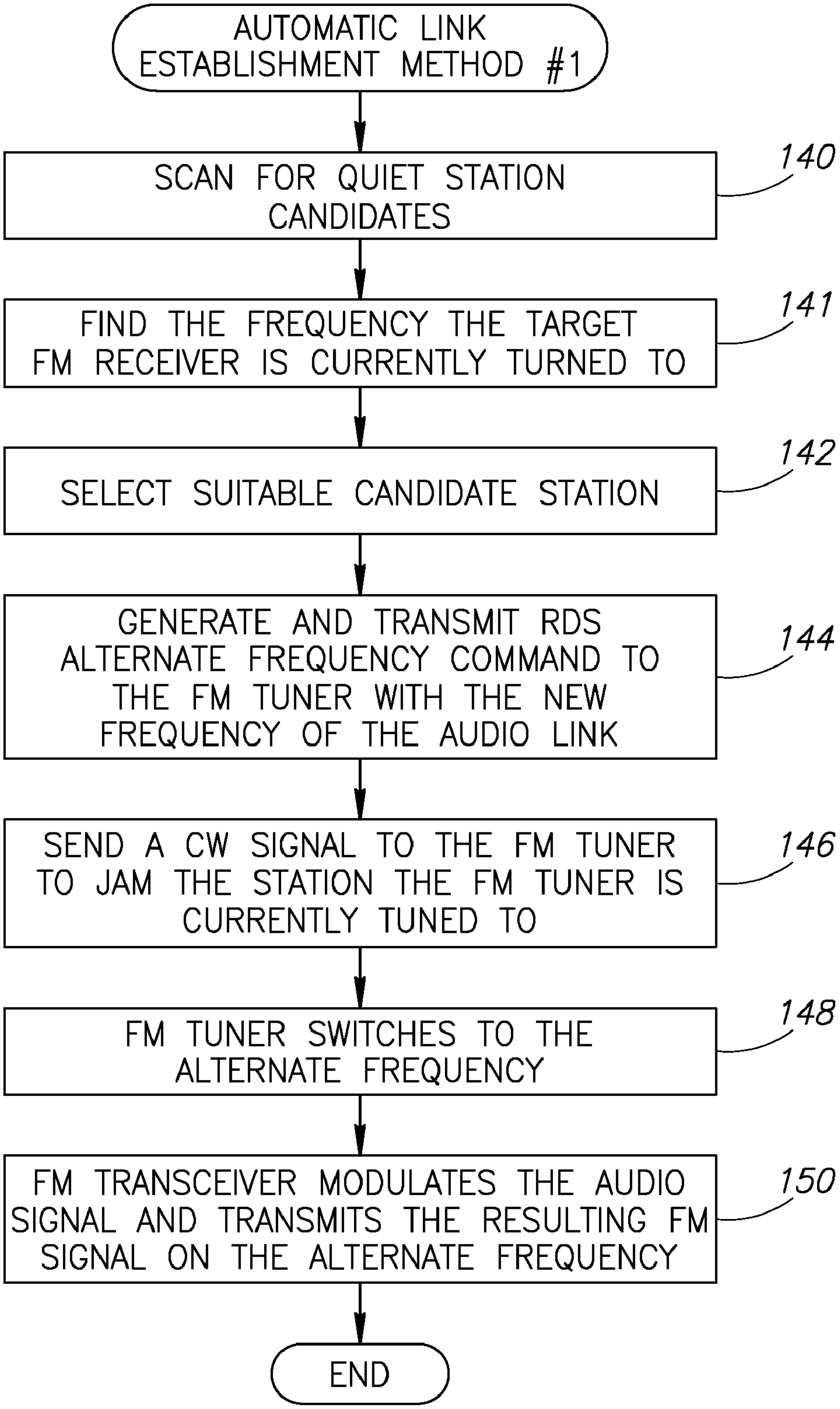
FIG. 3 is a flow diagram illustrating a first automatic link establishment method of the present invention.

A flow diagram illustrating a first automatic link establishment method of the present invention is shown in FIG. 3. This method is intended to be implemented in the communication device. It can be implemented in software/firmware for execution by a suitable processor, in hardware for execution by appropriate circuitry or a combination of both software/firmware and hardware.

Initially, when a link is to be established, the FM receiver (or the processor controlling the FM receiver) first scans the RF spectrum (such as to include the commercial FM spectrum) for suitable candidate frequencies over which the audio link is to be established (step 140). Additionally, this scan is intended to also find the frequency that the target FM-receiver is currently tuned to (step 141). Note that the scanning can be performed once for each connection setup or can be performed periodically wherein the optimal transmit frequency is repeatedly determined and the target radio is re-tuned accordingly.

Figure 4:
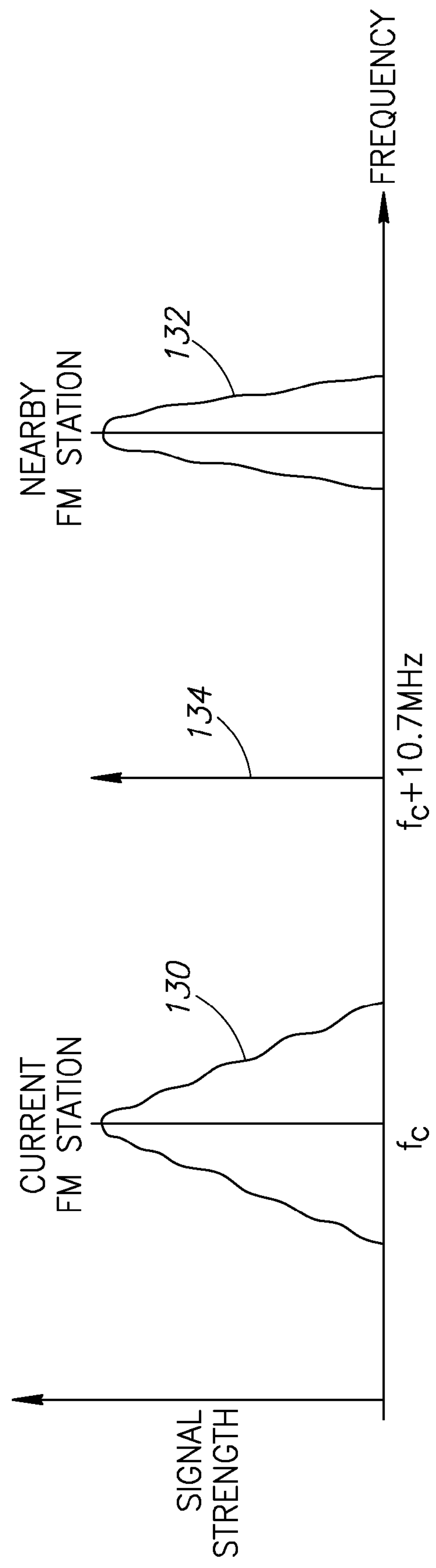
FIG. 4 is a diagram illustrating a portion of the FM radio spectrum.

Most importantly, the frequency on which the target FM receiver is currently tuned is detected by the existence of the RF leakage from the local oscillator (LO) of the target radio. Since the intermediate frequency (IF) used in commercial FM radios is set at 10.7 MHz, the receiver is adapted to listen for frequencies either 10.7 MHz above or below the carrier frequencies. In this manner, the communications device can determine the presence of and the signal strength of any FM station. This is illustrated in FIG. 4 which shows the spectrum 130 of an FM station the target radio is currently tuned to. The spectrum 132 of a nearby station is also shown. To determine that the target radio is tuned to the frequency $f_c$, it looks for a signal at a frequency of $f_c$+10.7 MHz (referenced 134). If the FM receiver finds sufficient signal amplitude at this frequency, it knows that the target radio is tuned to that frequency 10.7 MHz away (step 141).

The candidate frequencies for audio link establishment, should be sufficiently quiet to permit the reception of the FM transmitter signal. The quieter the frequency, the lower the power the FM transmitter needs to transmit to be properly received at the target radio. Other criteria used to select suitable candidate frequencies include a low reading of the received signal strength indication (RSSI) and very low signal to noise ratio (SNR) to indicate that no station exists at that frequency. One of the candidate frequencies is then selected based on the above criteria as the alternate frequency (step 142).

An "Alternate Frequency" or "AF" message or command is then generated that is compatible with the Radio Data System (step 144). Using the RDS AF command, the FM transmitter modulates this message on the frequency upon which the target FM receiver is currently tuned, wherein the determination of this frequency as achieved as described supra. The target FM radio receiver receives this RDS compatible bitstream, decodes it and marks the received data as the alternate frequency for the particular station.

The FM transmitter on the communication device then generates a signal that is adapted to interfere with (i.e. block or jam) the reception of the station the target FM radio receiver is currently tuned to (step 146). This causes the target radio to switch frequencies from the currently tuned station to the alternate frequency previously transmitted in the RDS bitstream by the FM transmitter (step 148). The target radio jumps to the alternate frequency when it detects that reception conditions in the current channel is poor. Once the target radio has switched frequencies, the audio signal is sent to the FM transmitter which modulates it with the FM carrier at the alternate frequency and broadcasts the resultant FM signal to the target radio for reception thereby (step 150).

In accordance with the invention, a mechanism is also provided that enables the communications device to verify that the target radio is tuned to the correct frequency. This is achieved, as described supra, by measuring the local oscillator leakage emissions emitted from the target FM radio receiver, while considering that the actual station is 10.7 MHz (i.e. the IF frequency) away from the frequency of the detected leakage signal. The target FM receiver is considered to be correctly tuned to the desired frequency, if the local oscillator leakage at 10.7 MHz away is detected above or below the frequency that was transmitted in the AF command.

Second Automatic Link Establishment Method

Figure 5:
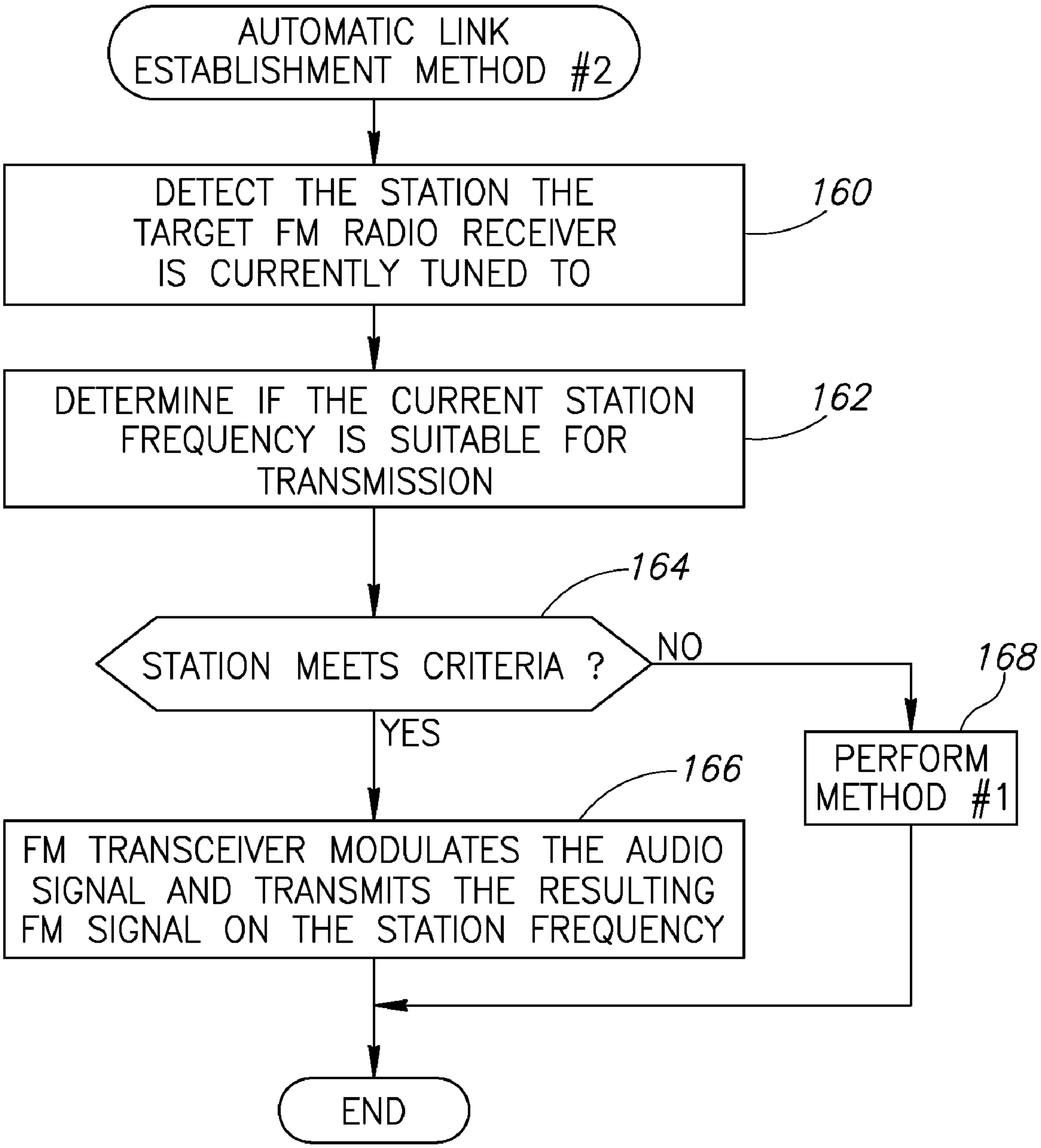
FIG. 5 is a flow diagram illustrating a second automatic link establishment method of the present invention.

A flow diagram illustrating a second automatic link establishment method of the present invention is shown in FIG. 5. In this second embodiment, the FM transmitter attempts to establish a link with the FM radio receiver without the use of RDS bitstream messages or commands. Using the receiver, the communication device first listens and scans the FM spectrum so as to detect the station the target FM radio receiver is currently tuned to (step 160). This is achieved, as described supra, by listening to the local oscillator leakage emissions emitted from the target FM radio receiver, while considering that the actual station is 10.7 MHz (i.e. the IF frequency) away from the frequency of the detected leakage signal.

Once the frequency the target radio is tuned to is determined, the communications device then analyzes the signal to determine whether that station frequency is a suitable candidate for transmission of the desired signal (step 162). Several characteristics are taken into account including the signal strength (RSSI), signal to noise ratio (SNR) of the received signal, etc. If the station the target radio is currently tuned to is too powerful, it may be difficult for the FM transmitter to overpower it. Depending on the implementation, the communications device can either use the signal strength reading to adjust the transmit power of the FM transmitter accordingly, or it can decide to re-tune the target FM radio to a different frequency that is sufficiently quiet (using the method of FIG. 3).

If the current station meets the criteria (step 164), the FM transmitter modulates the desired audio signal and transmits the resultant FM signal on the station frequency the target FM radio receiver is currently tuned to (step 166).

If the current station does not meet the criteria (step 164), the method #1 of FIG. 3 is performed, wherein the FM receiver scans for a quiet frequency and configures the target FM radio receiver with an alternate frequency using an RDS bitstream command (step 168). Rather than perform the method of FIG. 3, the present method of FIG. 5 can adjust the output power of the FM transmitter accordingly so as to ensure reception of the desired transmitted FM modulated signal.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of establishing a communications link between a target frequency modulation (FM) radio receiver and a communications device having an FM transmitter and FM receiver, said method comprising the steps of:

scanning an FM spectrum for one or more sufficiently quiet candidate frequencies and for the frequency that said FM radio receiver is currently tuned to;

selecting one of said one or more candidate stations as an alternate frequency for said target FM radio receiver;

sending a transmission incorporating said alternate frequency from said FM transmitter to said target FM radio receiver over the frequency the FM radio receiver is currently tuned to; and generating interference on said FM transmitter to cause said target FM radio receiver to switch to said alternate frequency.

2. The method according to claim 1, wherein said step of scanning said FM spectrum comprises the step of configuring said FM receiver to scan through said FM spectrum measuring amplitude of a received signal.

3. The method according to claim 1, further comprising the step of determining the frequency said target FM radio receiver is tuned to by measuring local oscillator leakage emitted therefrom.

4. The method according to claim 1, further comprising the step of determining whether said target FM radio receiver is tuned to said alternate frequency by measuring local oscillator leakage emitted therefrom.

5. The method according to claim 1, wherein said step of generating interference comprises the step of generating sufficient interference on a frequency said target FM radio receiver is currently tuned to so as to cause it to switch to said alternate frequency.

6. The method according to claim 1, further comprising the step of FM modulating an audio signal and transmitting the resulting FM signal over said FM transmitter to said target FM radio receiver.

7. The method according to claim 1, further comprising the waiting for an incoming call, and once arrived, FM modulating an audio signal and transmitting the resulting FM signal over said FM transmitter to said target FM radio receiver.

8. The method according to claim 1, wherein said transmission sent by said FM transmitter and said target FM radio receiver are compatible with the Radio Data System (RDS).

9. An apparatus for use in a communications device for establishing a communications link between a target frequency modulation (FM) radio receiver and said communications device, said communications device having an FM transmitter and FM receiver, said apparatus comprising:

means for configuring said FM receiver to scan an FM spectrum for one or more sufficiently quiet candidate frequencies and for the frequency said target FM radio receiver is currently tuned to;

means for selecting one of said one or more candidate stations as an alternate frequency for said target FM radio receiver;

means for sending a transmission incorporating said alternate frequency from said FM transmitter to said target FM radio receiver over the frequency the FM radio receiver is currently tuned to; and means for generating interference on said FM transmitter to cause said target FM radio receiver to switch to said alternate frequency.

10. The apparatus according to claim 9, wherein said means for selecting is operative to select a candidate frequency based on measured received signal strength indication (RSSI).

11. The apparatus according to claim 9, further comprising means for determining the frequency said target FM radio receiver is tuned to by measuring local oscillator leakage emitted therefrom.

12. The apparatus according to claim 9, further comprising means for determining whether said target FM radio receiver is tuned to said alternate frequency by measuring local oscillator leakage emitted therefrom.

13. The apparatus according to claim 9, wherein said means for generating is operative to broadcast sufficient interference on a frequency said target FM radio receiver is currently tuned to so as to cause it to switch to said alternate frequency.

14. The apparatus according to claim 9, further comprising means for FM modulating an audio signal and transmitting the resulting FM signal over said FM transmitter to said target FM radio receiver.

15. The apparatus according to claim 9, wherein said transmission sent by said FM transmitter and said target FM radio receiver are compatible with the Radio Data System (RDS).

16. A communications device, comprising:

a frequency modulation (FM) transmitter;

an FM receiver;

an audio source;

a processor coupled to said FM transmitter and said FM receiver, said processor operative to:

configure said FM receiver to scan an FM spectrum for one or more sufficiently quiet candidate frequencies and for the frequency a target FM radio receiver is currently tuned to;

select one of said one or more candidate stations as an alternate frequency for said target FM radio receiver;

generate and send a transmission incorporating said alternate frequency from said FM transmitter to said target FM radio receiver over the frequency the FM radio receiver is currently tuned to;

generate interference on said FM transmitter to cause said target FM radio receiver to switch to said alternate frequency;

means for FM modulating an audio signal provided by said audio source at a carrier frequency corresponding to said alternate frequency to yield a desired FM signal therefrom; and means for transmitting said desired FM signal via said FM transmitter to said target FM radio receiver.

17. The communications device according to claim 16, wherein said communications device comprises a multimedia player.

18. The communications device according to claim 16, wherein said communications device comprises a cellular telephone.

19. The communications device according to claim 16, wherein said communications device comprises a personal digital assistant (PDA).

20. The communications device according to claim 16, wherein said transmission and said target FM radio receiver are compatible with the Radio Data System (RDS).

* * * * *